United States Patent [19]

Curtin

[11] Patent Number: 4,672,660
[45] Date of Patent: Jun. 9, 1987

[54] METHOD AND SYSTEM FOR IDENTIFYING TELEPHONE CALLERS

[75] Inventor: William J. Curtin, Madison, Wis.

[73] Assignee: Amtel Communications, Inc., Madison, Wis.

[21] Appl. No.: 742,594

[22] Filed: Jun. 7, 1985

Related U.S. Application Data

[63] Continuation-in-part of Ser. No. 465,814, Feb. 14, 1983, abandoned.

[51] Int. Cl.$^4$ .................. H04M 1/64; H04M 1/56
[52] U.S. Cl. .................. 379/88; 379/142; 379/233; 379/245
[58] Field of Search .................. 179/5.5, 2 A, 84 C, 179/18 BG, 18 BH, 18 FH, 18 B

[56] References Cited

U.S. PATENT DOCUMENTS

| | | | |
|---|---|---|---|
| 3,041,406 | 6/1962 | Killion | 179/18 |
| 3,728,486 | 4/1973 | Kraus | 179/2 R |
| 3,748,396 | 7/1973 | Hestad et al. | 179/18 DA |
| 3,793,487 | 2/1974 | Kilby | 179/6 R |
| 3,898,396 | 8/1975 | Gushue et al. | 179/175.3 A |
| 4,017,689 | 4/1977 | Richards et al. | 179/18 EB |
| 4,277,649 | 7/1981 | Sheinbein | 179/18 B |
| 4,355,207 | 10/1982 | Curtin | 179/18 FC |
| 4,371,752 | 2/1983 | Matthews et al. | 179/7.1 TP |
| 4,376,875 | 3/1983 | Beirne | 179/18 B |
| 4,393,278 | 7/1983 | Miyoshi | 179/84 C |
| 4,488,005 | 12/1984 | Frantz | 179/18 B |
| 4,567,323 | 1/1986 | Lottes et al. | 179/18 B |
| 4,582,957 | 4/1986 | Hayes et al. | 179/18 BE |
| 4,582,959 | 4/1986 | Myslinski et al. | 179/27 FH |

FOREIGN PATENT DOCUMENTS 0159111 12/1979 Japan .................. 179/5.5
0020367 2/1981 Japan .................. 179/5.5

Primary Examiner—Gene Z. Rubinson
Assistant Examiner—M. E. Connors
Attorney, Agent, or Firm—Robert E. LeBlanc

[57] ABSTRACT

An apparatus is disclosed for identifying who is placing a call to a telephone prior to answering. The apparatus, which is preferably located at the telephone central office, includes a switching matrix having a plurality of DID access lines coupling the switching matrix to the central telephone office. The switching matrix also has a plurality of input and output lines which are assigned to individual subscribers' telephones who desire to identify callers prior to answering. In the preferred embodiment of the invention, twenty DID access lines are used to couple the telephone central office to the switching matrix and one hundred subscription and input and output lines are used to couple the switching matrix to individual subscriber telephones. The switching matrix is coupled to a programmed microprocessor which controls the operation of the system including the generation of a digitally synthesized vocal announcement of at least the number being called. The vocal announcement is coupled to a subscriber's telephone which is receiving an incoming call on one of a plurality of numbers assigned to that subscriber for which the subscriber desires to identify the caller prior to answering. Preferably, each subscriber is given a block of five or ten assigned numbers which the subscriber gives to individuals or organizations from which the subscriber wishes to identify telephone calls prior to answering. The subscriber's knowledge of who was informed of each assigned number enables the vocal announcement of the number used for placing a call to serve as an identification of the caller.

26 Claims, 15 Drawing Figures

METHOD AND SYSTEM FOR IDENTIFYING TELEPHONE CALLERS

RELATED APPLICATIONS

This application is a continuation-in-part of U.S. patent application Ser. No. 465,814 filed Feb. 14, 1983, now abandoned, in the name of William J. Curtin.

BACKGROUND OF THE INVENTION

1. Field of the Invention

The invention relates to apparatus for permitting residential or business telephone subscribers to identify who is placing a telephone call to the subscriber.

2. Description of the Prior Art

U.S. Pat. No. 4,266,098 to Novak discloses a system capable of monitoring information contained in incoming telephone calls. The disclosed system automatically holds the incoming call and displays the identity of the caller. Ringing of the subscriber's telephone is initiated either at certain times and/or for certain callers. After the caller places a call to the subscriber, the call is interrupted and answered by an answering device. The answering device requests that the caller enter a code that has been previously provided to the caller. If the code matches a code within the answering device which code represents a telephone number that the subscriber had indicated a willingness from which to receive calls, the call will be rung through to the subscriber. This system has drawbacks. First, the caller would know that the subscriber has decided not to accept the call and not merely that the subscriber is not at home, which is the implication if the telephone at the subscriber location would ring without being answered. Second, the subscriber must enter and store in the system those codes either he will receive or that he will not receive instead of making the decision as to which calls he wants to accept when the call actually comes in. A third drawback is the requirement that the caller take some positive step in connection with completing the identification process instead of the procedure being carried out automatically, independent of any activity by the caller.

U.S. Pat. No. 4,242,539 to Hashimoto discloses a system in which the calling party's telephone number will be displayed at the subscriber location on a digital display device. The subscriber then has the option whether or not to answer the call after viewing the caller's telephone number. The telephone number of the calling party must be stored in the telephone exchange of the calling party and such number must be sequentially transmitted to the telephone exchange of the called party. Thus, the system depends upon modification and/or inclusion of additional equipment at each of the telephone exchanges. The disclosed system could not be put into operation without the inclusion of additional equipment at each subscriber location.

U.S. Pat. No. 3,787,626 to Subieta discloses a system for displaying the calling party's telephone number at the telephone set of the called party. Each of the calling locations must include a transmitter for transmitting a pulse train of audio frequency signals. The subscriber receives this signal and upon decoding the signal provides identification of the telephone number calling the subscriber. The subscriber then has the option of whether or not to answer the telephone. This system has the drawback of requiring both the callers and the subscriber to incorporate additional specifically designed equipment at each location.

U.S. Pat. No. 4,277,649 issued to Sheinbein describes a comprehensive and elaborate system for providing customized telephone services and for automatically screening calls to a call station wherein the nature of the screening is designated and controlled by the called station. According to this arrangement the called station having the screening service is provided with a memory located at a destination switching center which serves the station. The customer accesses the memory and enters in the memory the identity of all calling lines whose calls are to be screened. In addition, an indication is entered in the memory of the treatment to be given to calls incoming from these lines. When an incoming call arrives at the switching office containing the called station's memory, the control equipment ascertains if the called customer is provided with the special screening service feature. If this service feature is provided, a signal is sent to the originating switching office requesting the identity of the calling line. Using the calling line identity, the memory at the destination office is read to ascertain if the calling line is to be given the special treatment requested by the called party. The control equipment then disposes of the call according to the special treatment indication found in the memory location assigned to the calling line identity or sends a message to the originating office as to the disposition of the call. Among the special service treatments given calls from certain calling lines include selective call blocking, selective call waiting, selective call forwarding, distinctive ringing, special billing and many others. This arrangement requires considerable equipment, is relatively expensive and is primarily adapted to large installations.

U.S. Pat. Nos. 3,748,396 to Hestad et al and 4,017,689 to Richards et al describe PABX systems which provide for reception of both DID calls and regular calls to the PABX number group. Japanese Patent No. 154914 describes a switched access arrangement in which the identification of the calling number is supplied to an intended recipient while U.S. Pat. No. 4,071,699 to Jovic et al discloses delay of call completion pending identification of the calling line. Japanese Pat. No. 159111 discloses a system for recording the number and date of unanswered calls.

U.S. Pat. Nos. 4,289,931 to Baker; 3,727,003 to Paraskevakos; and 3,686,440 to Kroeger disclose systems similar to that previously described with reference to U.S. Pat. No. 3,787,626. Specifically, each of these patents discloses a system in which a signal is transmitted from the calling location which signal is received and decoded by the subscriber location for identifying the telephone number of the particular caller.

SUMMARY OF THE INVENTION

An object of the present invention is to provide an improved system for enabling a telephone subscriber to identify certain incoming calls.

Another object of the present invention is to enable a telephone subscriber to easily and rapidly identify incoming calls in order to be able to determine whether or not to answer such caller without the caller being aware of such decision.

It is another object of the invention to provide a simple and inexpensive system to permit a residential or business subscriber to selectively answer incoming calls by determining who is calling according to the number that was called.

It is an object of the invention to provide a simple and inexpensive system to permit a residential or business subscriber to selectively answer incoming calls by determining who is calling according to the number that was called wherein a distinctive ring indicates that one of a pre-established group of numbers is calling followed by an announcement specifying which of the pre-established group of numbers is calling whereby the subscriber can make an informed decision about when, whether and how to answer a call.

It is an object of the invention to provide a simple and inexpensive system of the foregoing type wherein a speech synthesizer provides the identification and wherein the service is self-instructional and self-explanatory.

The invention enables a telephone subscriber to identify the number to which a telephone call is placed and consequently, the identity of the caller prior to answering. The invention produces a digitally synthesized vocal announcement of the number being called to place a call to the subscriber on the subscriber's telephone. The invention produces the vocal announcement of any of a plurality of numbers assigned to the subscriber by the telephone central office on which a call to the subscriber is being placed. The invention preferably is located within the central telephone office which eliminates the requirement of placing additional equipment at each subscriber's telephone installation.

The invention includes means for identifying the particular number which has been assigned to the subscriber by the telephone central office that is used to place a call to the subscriber's telephone; means responsive to the means for identifying the assigned number used to place the telephone call for causing the production of a vocal announcement which identifies the particular assigned number used to call the subscriber's telephone; and means coupled to the means for causing the production of the vocal announcement for coupling the vocal announcement to the subscriber's telephone line so that a person answering the subscriber's telephone receives the vocal announcement prior to connection with the caller.

In addition to vocally identifying the number being used to call the subscriber's telephone, the invention includes apparatus for storing the time, date and number used for placing unanswered calls to the subscriber's telephone so that the subscriber may be informed of missed telephone calls.

The invention also can perform a call waiting function which provides the subscriber with an audible tone that an incoming call is being placed on one of the numbers assigned by the telephone central office while the subscriber is conducting a telephone conversation with another party.

The invention has numerous advantages including the following: the invention may be connected to a subscriber's conventional listed telephone service so that the subscriber may be called without activating the speech synthesizer. Therefore, the invention appears to be essentially transparent to people calling the subscriber at the subscriber's normal listed telephone number. The invention is only activated when a person places a call to one of the subscriber's unpublished telephone numbers which that person has been given the identity of by the subscriber. The invention is totally compatible with existing state of the art telephone hardware including dual tone multifrequency (DTMF), push button and rotary dial telephones. The invention is preferably operated by making a central installation at or in proximity to the telephone central office. Installation at a central location obviates the problem with many of the prior art devices which require installations at both the calling parties' and subscribers' telephone locations. The subscriber may use the invention to decide to not talk to an individual placing a call on one of the block of assigned numbers without giving the caller any indication that a person is at the location of the subscriber's telephone. The invention's advantage of not informing the caller if a person at the subscriber's telephone installation decides not to answer a call prevents potential embarrassment consequent from the caller knowing that someone at the subscriber telephone installation does not wish to answer the telephone. The invention is particularly advantageous to individuals or businesses which require an easy, reliable method of identifying the source of incoming telephone calls. The invention is fully compatible with existing additional features provided by the telephone company such as automatic dialing, conference calling and call forwarding.

The switching matrix used with the invention uses PCM switching technology. Connections to the switching matrix are made through DID access lines which may be leased from the telephone company. While the invention is described infra with respect to a suitable switching matrix and microprocessor, it should be understood that the invention may be practiced without limitation to any particular switching matrix and/or microprocessor. Depending on the mode of operation, the invention generates ringing signals or utilizes ringing signals produced by the telephone company central office. When the subscriber's listed number is called, the ringing signal generated by the telephone central office is transmitted through the switching matrix of the invention to the subscriber without any alteration. When the subscriber is receiving a telephone call on one of the numbers which has been assigned to him by the telephone company central office, a ringing signal is generated by the invention which audibly distinguishes the call from calls to the subscriber's listed number. The distinct audible difference between calls coming in on the customer's regular listed number and one of the assigned unlisted numbers enables the subscriber to readily identify the source of the incoming call as being from a listed or an unlisted number.

In an alternative embodiment of the invention, the digital speech synthesizer generates a different audible code in response to the detection of a call placed on each of the different assigned numbers. The audible frequency range code is coupled to the subscriber's line in the same manner as the digitally synthesized vocal announcement. The audible code may be detected by a person located at the subscriber's telephone by listening to the transmitted code on the telephone. An example of such a code would be having a predetermined number of rings for signalling the placement of a call on each different assigned number. Alternatively, the code may be detected electronically by a suitable detector connected to the telephone line. The detector may generate a signal such an energizing one of a plurality of lights which indicates a call being placed to a particular one of the assigned numbers. An example of a detector would be a DTMF detector which would decode DTMF tones generated by the speech synthesizer or in response to the control program. The energization of the light or other indicator may be visually detected by a person at the subscriber's telephone. The person makes the decision to answer the incoming call in the same manner as described in the preceding embodiment.

The invention includes a method for identifying callers who place calls to a subscriber on any of a group of numbers assigned to the subscriber by a central telephone office in which the calls to the subscriber's telephone are from any installation which is coupled through the central telephone office to which the subscriber's line is coupled. The method comprises the steps of identifying the assigned number used to call the subscriber's telephone, producing a vocal announcement of the number used to call the telephone and applying the vocal announcement to the subscriber's telephone line so that a person answering the subscriber's telephone receives the announcement prior to connection to the caller.

DESCRIPTION OF THE PREFERRED EMBODIMENT

The invention is an apparatus which permits a residential or business subscriber of conventional telephone service to determine the identity of a person placing a telephone call to the subscriber and thus selectively answer incoming calls. Upon detection of a telephone call of one of a plurality of numbers assigned to a subscriber, the invention produces a vocal announcement of the number that has been dialed to call the subscriber. The vocal announcement is coupled to the subscriber's telephone installation. The knowledge by a person at the subscriber's telephone of the individuals who have been informed that the subscriber may be reached by placing a call to a particular unlisted number enables the vocal announcement of the number being called to function as an identification of the caller. The generation of the vocal announcement is preferably by a digital speech synthesizer under the control of a microprocessor, which vocal announcement of the calling number is transmitted to the subscriber prior to the answering of the subscriber's telephone. The digitally synthesized vocal announcement of the number which is being called enables the subscriber to decide to either answer the call or to not answer the call without alerting the caller that someone at the subscriber's telephone is making a decision to answer the call. Once the number to which the call is being placed is detected, the last three detected digits are used to control the generation of the previously stored digitally synthesized vocal announcement.

With the invention, each subscriber is assigned a block of numbers, which preferably is five or ten, that are given by the subscriber to individuals for their use in placing calls to the subscriber's telephone. These assigned numbers are the same numbers which are stored in the memory of the speech synthesizer so that the detection of placing a call on one of the numbers may be used as a signal for locating the digitally synthesized vocal announcement in memory and initiating the generation of the vocal announcement to the subscriber. In addition to the block of numbers which are assigned to the subscriber which are given out selectively to persons whose identity it is desired to detect before answering telephone calls, the subscriber's telephone is hooked up through the telephone central office in the conventional manner so that the subscriber may receive calls which are dialed on the subscriber's listed number.

The invention causes the generation of a ring signal at the subscriber's telephone which is audibly characteristic of the dialing of one of the numbers assigned to the subscriber in the assigned block of unlisted numbers so that the subscriber may distinguish the reception of a telephone call from a caller on either the subscriber's listed number or on one of the unlisted numbers.

Figure 1:
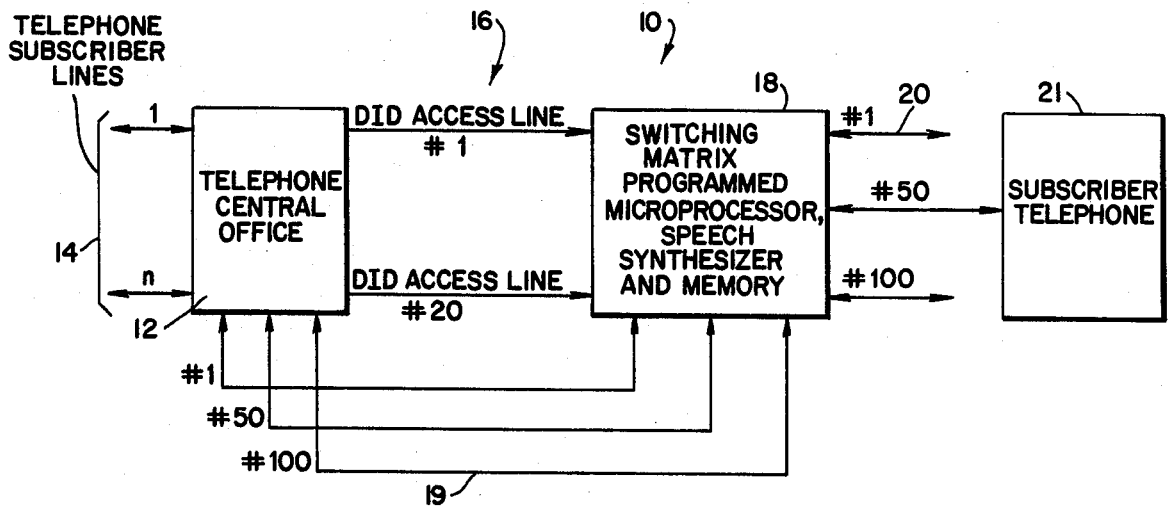
FIG. 1 is a system schematic of the present invention.

FIG. 1 illustrates a system schematic diagram of the present invention. The system indicated generally at 10 is preferably used at or in proximity in the location of the telephone central office 12 to eliminate the use of lengthy transmission lines. The telephone central office has a plurality of subscriber lines 14 which are identified in FIG. 1 by the numbers 1 through n. In addition to the connection of individual telephone lines to the central office 12, DID access lines 16 couple the central office to switching matrix, programmed processor, speech synthesizer and memory shown at block 18. DID access lines 16 may be leased from the telephone central office for various uses in which the telephone company's responsibility is limited to connecting calls to a particular DID access line 16 which is addressed by the last three digits in the dialed telephone number. In the preferred form of the invention, a total of twenty DID access lines 16 are leased from the telephone central office to provide the capability of subscribers to the invention having available a block of one thousand assigned numbers. A more detailed illustration of interrelationship between elements contained in the block 18 appears in FIG. 2.

Figure 2:
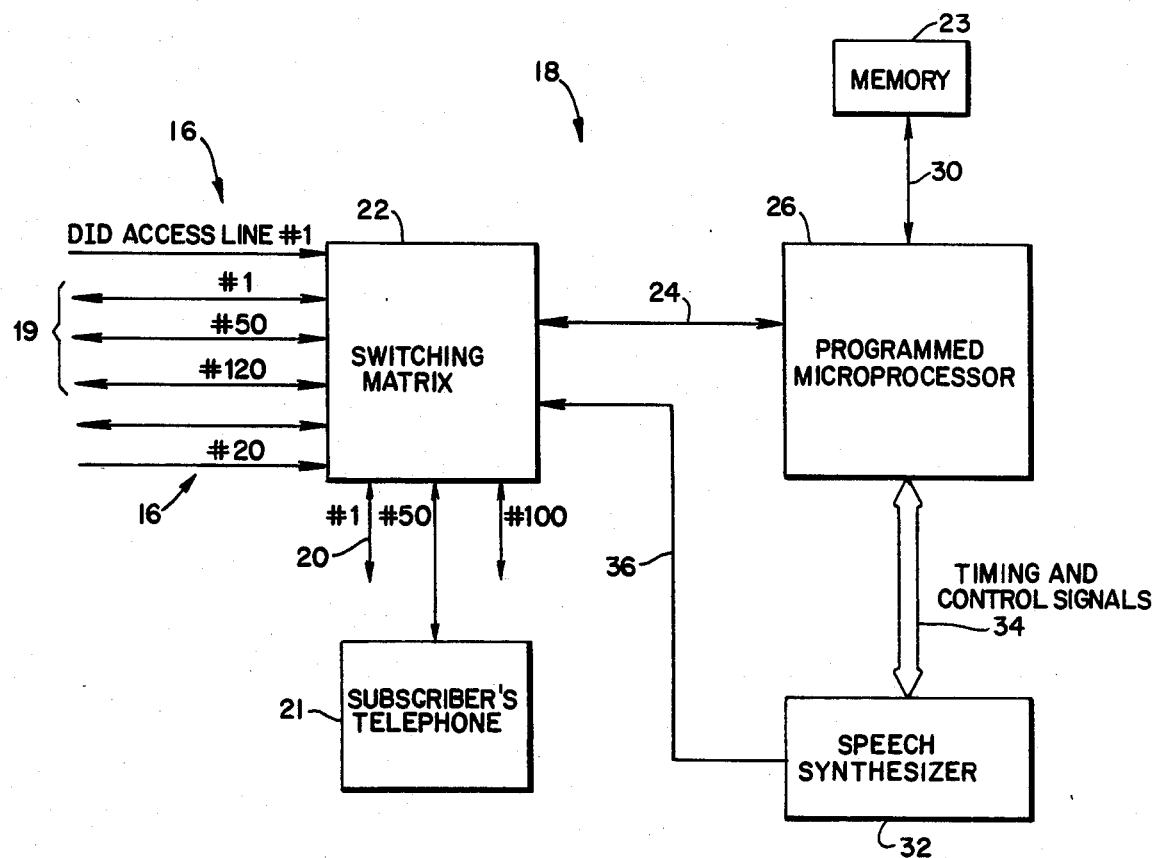
FIG. 2 is a detailed view of the switching matrix, the programmed microprocessor, speech synthesizer and memory block illustrated in FIG. 1.

Referring to FIG. 2 the switching matrix, programmed microprocessor's speech synthesizer and memory shown generally at 18 contains one hundred input lines 19 running between switching matrix block 22 and the telephone central office 12 and one hundred output lines 20 running between the switching matrix block 22 and the individual subscribers 21. It should be understood that each line 19 which runs from the central office 12 to the apparatus 18 is selectively connected to the correspondingly numbered output line 20 when the microprocessor control is signaled by a person at the subscriber's telephone 21 that it is desired to receive a telephone call on one of the numbers assigned to the subscriber. With the invention, up to one hundred subscribers may be serviced with the system as illustrated in FIGS. 1 and 2. It should be understood that the invention is not limited to any particular number of subscribers. The output lines 20 are identical to that provided by the telephone central office for regular service and transmit calls to the subscriber on the subscriber's listed telephone number as well as calls to the block of numbers which have been assigned to the customer which are made available by the twenty DID access lines 16. While FIGS. 1 and 2 illustrate only a single connection of an output line (50) to subscriber's telephone 21, it should be understood that, in actuality, up to one hundred output lines 20 connect the block 18 to individual telephones 21. The one thousand lines, which are provided for use with the invention by the connection of the twenty DID access lines 16, may be numerically, sequentially or randomly assigned to the one hundred customers who have output lines 20 coupling the central office 12 via block 18 to their telephone installations.

The switching matrix, programmed microprocessor, speech synthesizer and memory block 18 perform two important functions. The first function is identification of the assigned number used to place a call to a particular subscriber who has one of the one hundred lines 20 coupling the subscriber to the block 18. In addition to identifying the assigned number used to call one of the subscriber's telephones, the block 18 additionally performs the function of causing the production of the vocal announcement which identifies the particular assigned number used to call the subscriber's telephone. In the preferred form of the invention, the vocal announcement is generated by digital speech synthesis using commercially available circuits. Digital speech synthesis circuits are available with standard or special purpose vocabularies. A detailed description of the method of generating digitally synthesized speech messages will not be included herein for the reason that digital speech synthesis is well known to persons skilled in the art. The block 18 additionally contains means for coupling the vocal announcement, which has been generated by the speech synthesizer, to the line of the particular subscriber being called for the purpose of making the vocal announcement of the number being used to place the call audible on the subscriber's telephone.

FIG. 2 illustrates a more detailed block diagram of the block 18 illustrated in FIG. 1. A switching matrix 22, has inputs of the twenty DID access lines 16 and the one hundred subscriber input lines 19. The switching matrix 22 also has one hundred output lines 20. In addition to the foregoing input and output lines, the switching matrix 22 is connected to a programmed microprocessor 26 which may be any commercially available microprocessor suitable for implementing the control program described in conjunction with FIG. 3 infra. One of the basic functions performed by the programmed microprocessor 26 is to detect the last three digits of the number being used to call the subscriber. The connection 24 between the switching matrix 22 and the programmed microprocessor 26 couples the last three digits of the number, which is being called to reach a particular subscriber, to the microprocessor for identifying these three digits. The detection of the three digits may be performed by known circuitry such as DTMF decoding circuits which rely on the tone content of the signals generated by the calling telephone. With the detection of the last three digits, the call on any one of the DID access lines 16 is completely identified to permit the microprocessor to make connection with the desired one of the one hundred subscribers whose phones are coupled to the block 18 via lines 20. Since the detected digits correspond to one of the one thousand lines provided by the twenty DID lines 16, the detected digits may be used as an address to locate in memory 28 a digitally synthesized vocal announcement which is to be coupled to the particular subscriber being called for the purpose of announcing the number being used to call the subscriber. To accomplish this function, the programmed microprocessor 26 is coupled to memory 28 via line 30. Once the desired location within memory is located by detection of the last three digits of the called number and the subscriber's telephone 21 has gone off hook in response to the ring characteristic of an assigned number, the programmed microprocessor 26 initiates the generation of the digitally synthesized vocal announcement stored at that location and controls the coupling of the vocal announcement through the switching matrix 22 to the line 20 of the subscriber being called.

The interconnections of the programmed microprocessor 26 and the speech synthesizer 32 are illustrated schematically by way of bus 34 with an appropriate indication that timing and control signals are transmitted by the bus. After the last three digits being used to call a subscriber are detected and the digitally synthesized vocal announcement is addressed in memory 28, the microprocessor 26 causes the speech synthesizer 32 to output the vocal announcement of the number being used to call the subscriber. Once it is detected by the microprocessor 26 that the subscriber's telephone has gone off hook to receive the information, the vocal announcement is coupled directly to that subscriber's telephone lines to cause the person at the subscriber's telephone to hear an enunciation of the number being used to place the call to the subscriber. As will be described in detail infra in conjunction with the discussion of FIG. 3, after the vocal announcement is heard at the subscriber's telephone, the subscriber makes the choice of whether or not to answer the incoming call.

Figure 4:
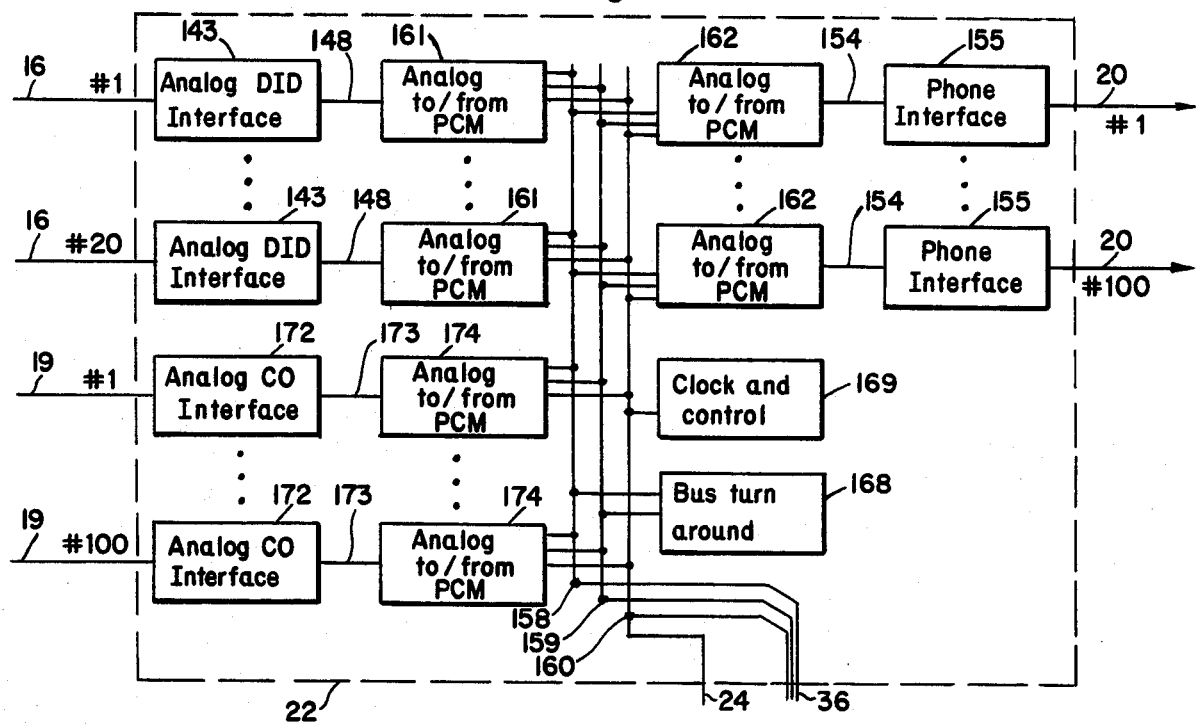
FIG. 4 is a detailed view of a portion of the switching matrix showing an analog interface section for each of the types of interfaces.

Further details of a typical implementation of the system illustrated in FIG. 2 is now described in detail in connection with FIGS. 4–14. The switching matrix 22 in FIG. 2 is composed of 0 number of elements. FIG. 4 illustrates one design of one portion of such device. Thus, there are seen in FIG. 4 analog DID interface units 143 connected to the twenty DID access lines 16, analog central office (CO) interface units 172 connected to the one hundred subscriber input lines 19, and the actual output telephone interface units 155 connected to the one hundred output lines 20 which interconnect to subscribers telephones such as that indicated at 21. The interfaces 143 are connected via lines 148 to analog/digital converters 161. The interfaces 172 are connected via lines 173 to analog/digital converters 174, and the interfaces 155 are connected via lines 154 to analog/- digital converters 162. The analog/digital converters 161, 174 and 162 are connected to the switching bus or highway 158, 159 and 160 (24 and 36 in FIG. 2) which may provide thirty-two time slots. The converters 161, 174 and 162 contain the switch logic to use the PCM busses or highways 158, 159 and 160. A PCM highway or bus clock generator 169 is provided as well as a buffer unit 168 to loop around the transmit PCM highway to the receive PCM highway.

Figure 5:
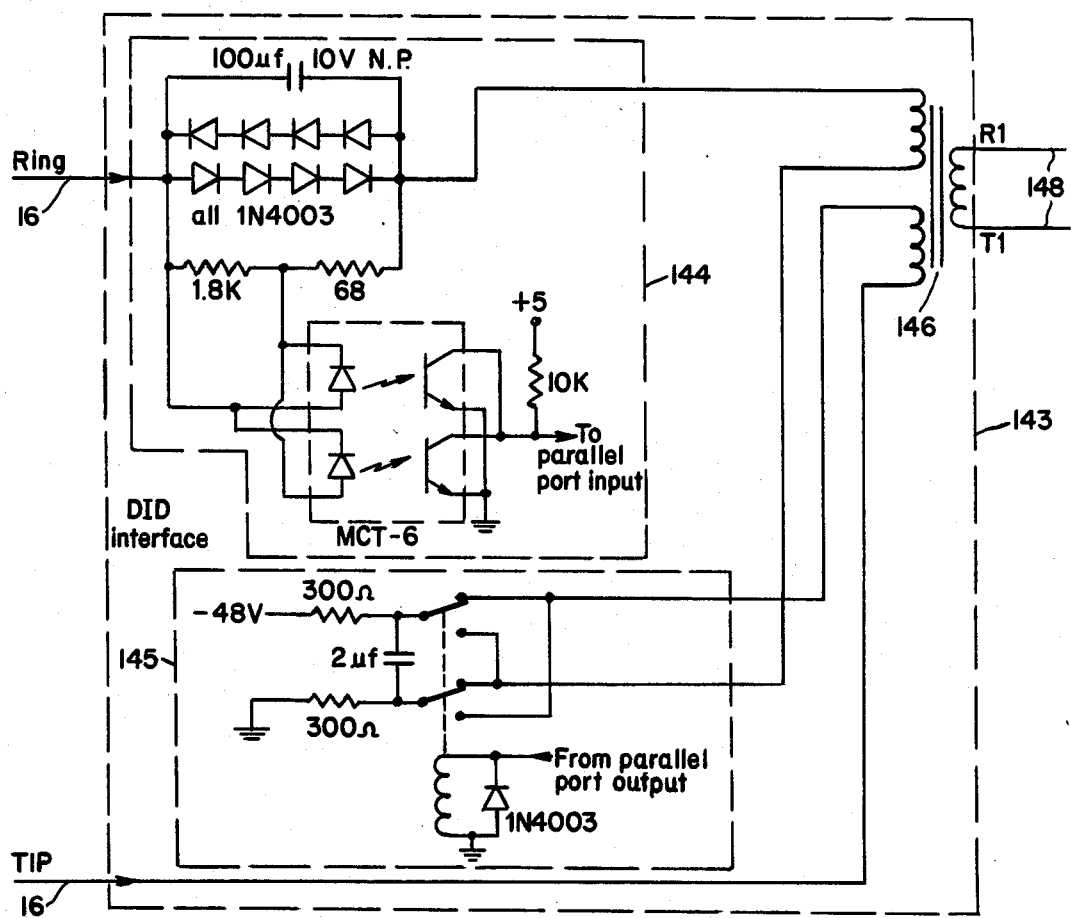
FIG. 5 is a detailed view of the analog DID interface in FIG. 4.

The analog DID interface 143 in FIG. 4 may consist of a unit such as illustrated by way of example in FIG. 5. This unit consists of a current flow detector 144 to receive digits/on hook/off hook, a battery supply 145 with ability to reverse polarity, and a 600 ohm telephone line transformer 146. The interface 143 in FIG. 5 is connected to the DID tip and ring lines 16 and via output lines 148 to the convertes 161 in FIG. 4.

Figure 6:
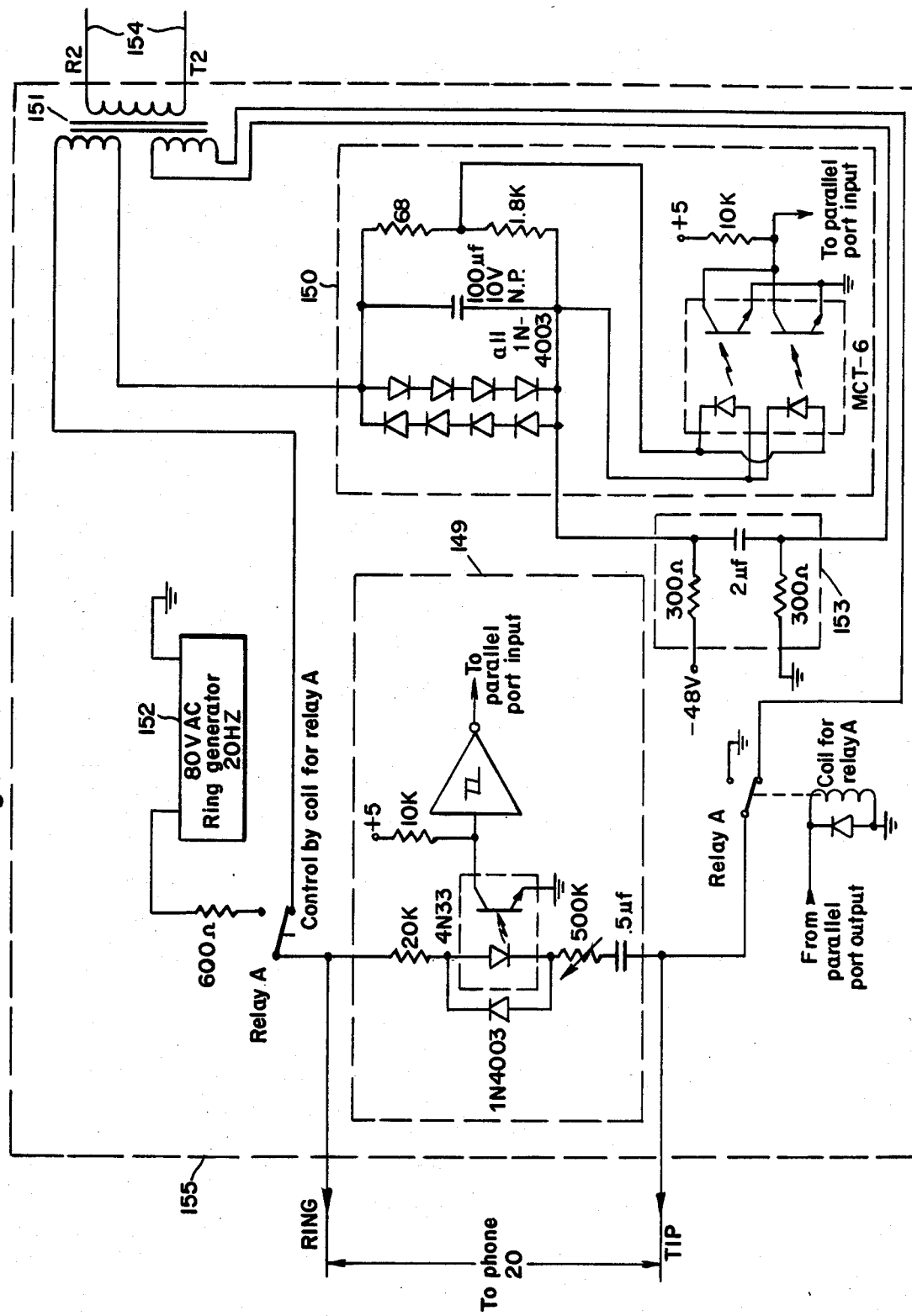
FIG. 6 is a detailed view of the analog telephone interface of FIG. 4.

FIG. 6 shows a typical output line interface 155. This is connected between the output tip and ring lines 20 connected to the subscriber's telephone such as 21 in FIG. 2 and the input tip and ring lines 154 which are connected to a 600 ohm telephone line transformer 151. The transformer 151 provides the coupling to the line 154 in FIG. 4 coupling the telephone interfaces 155 to the converters 162. The unit in FIG. 6 consists of a current flow detector 150 to receive digits/on hook/off hook, a battery supply 153, a ring voltage generator 152 with connecting relay, and an answer phone during ring detector 149.

Figure 7:
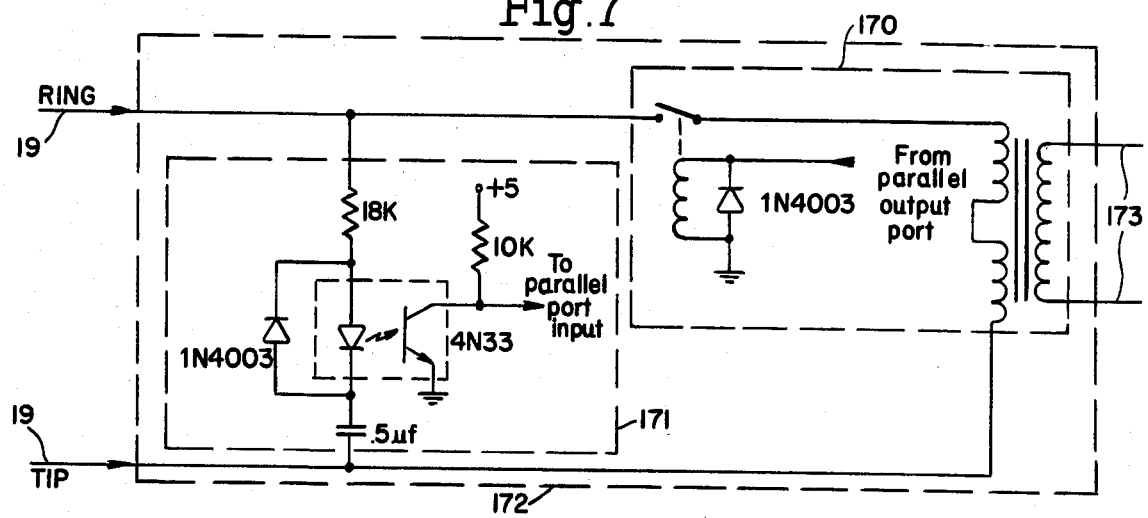
FIG. 7 is a detailed view of the analog central office interface of FIG. 4.

FIG. 7 illustrates the analog central office interface 172. This is connected to tip and ring lines 19 to and from the central office and through a 600 ohm telephone line transformer to lines 173 to converters 174 in FIG. 4.

Figure 8:
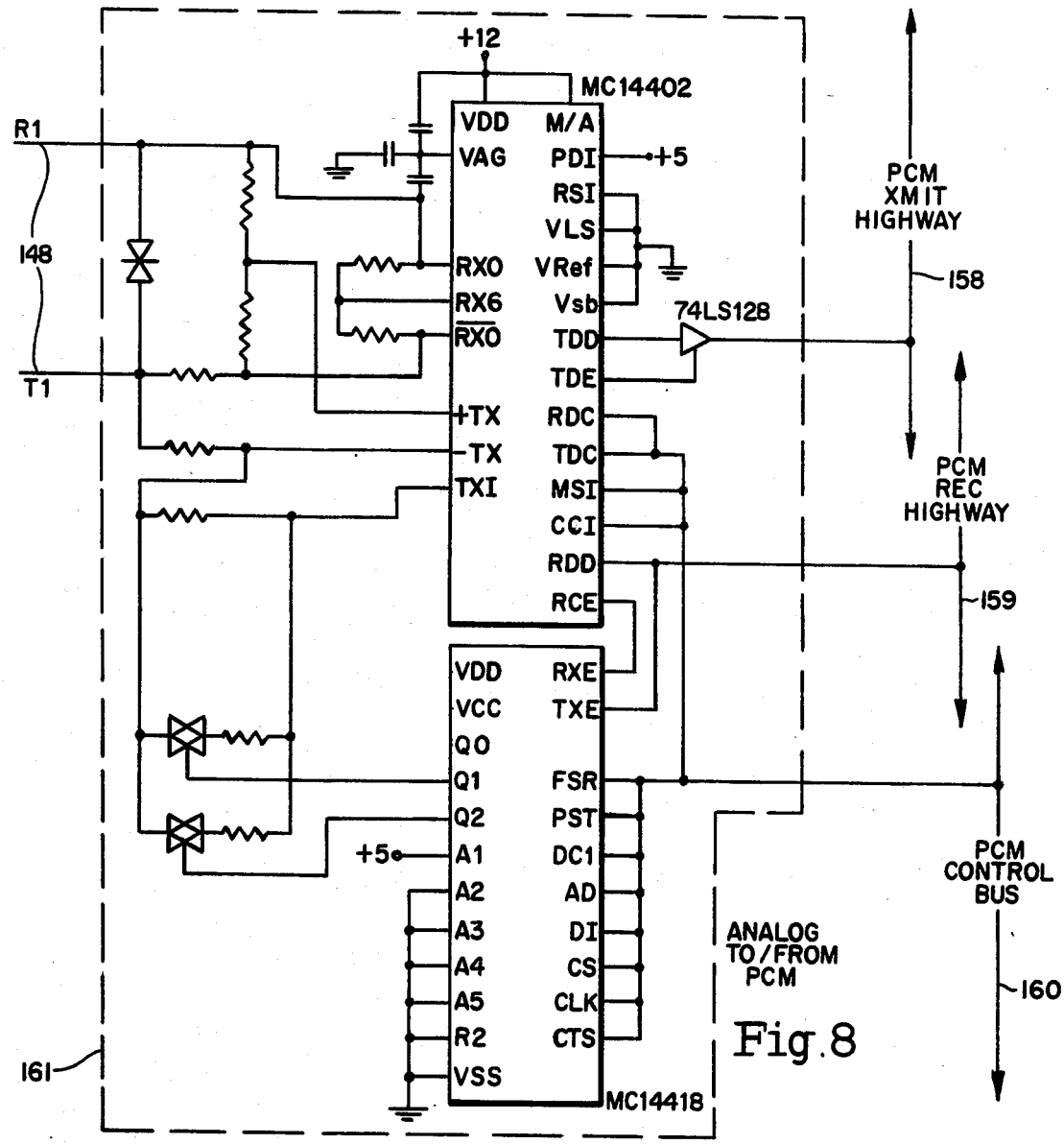
FIGS. 8, 9 and 11 are detailed views of the analog to PCM conversion circuits.
Figure 9:
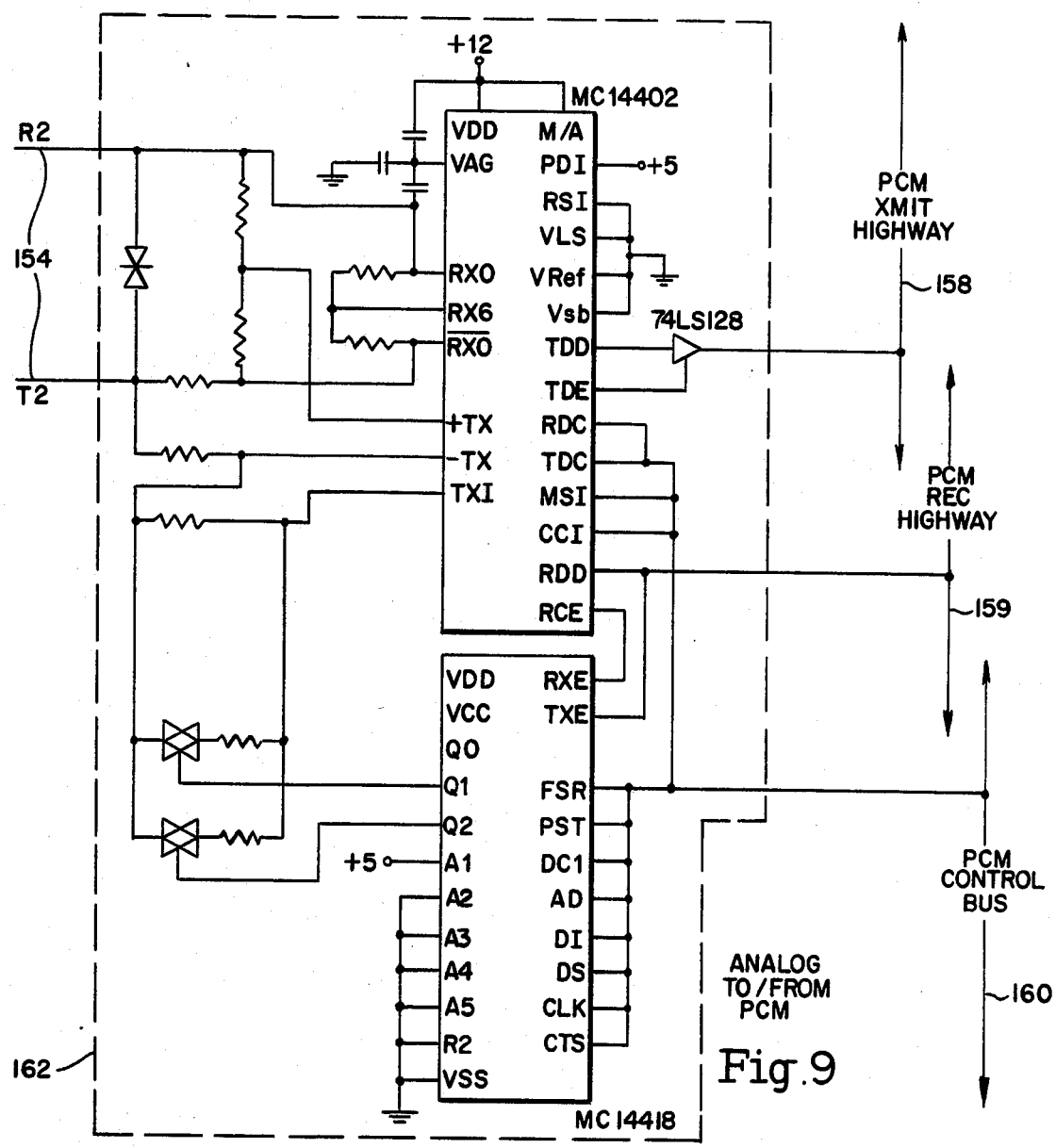
Figure 11:
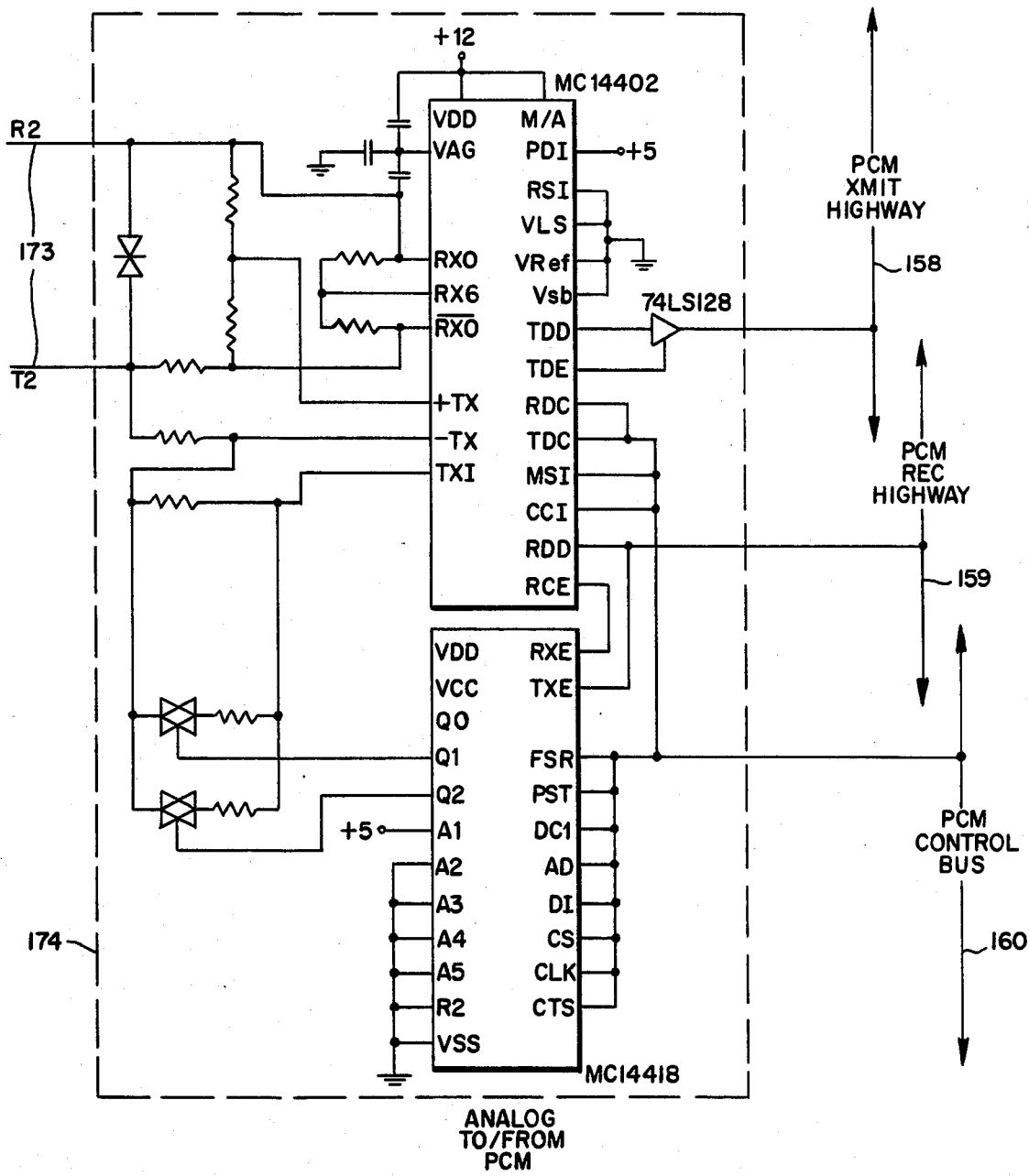

Suitable analog to PCM conversion circuits are illustrated by way of example in FIGS. 8, 9 and 11. The legends therein are based upon Motorola components. These circuits handle the analog to/from PCM conversion and selection of which time slots to use on the PCM highways 158, 159 and 160. FIG. 8 shows a typical converter 161 connected via lines 148 to interface units 143 in FIG. 4. The output of the converter 161 is connected to the PCM transmit bus or highway 158, to the PCM receive bus or highway 159 and to the PCM control bus 160. FIG. 9 shows a converter 162 connected via lines 154 to the interface units 155 which are connected to the subscriber telephone lines 20. Converters 162 are also connected to the PCM transmit bus or highway 158, to the PCM receive bus or highway 159 and to the PCM control bus 160. Similar converter units may be provided at 174 in FIG. 4 to connect interfaces 172 to the bus or highway 158, 159 and 160. Such a unit is illustrated in FIG. 11.

Figure 10:
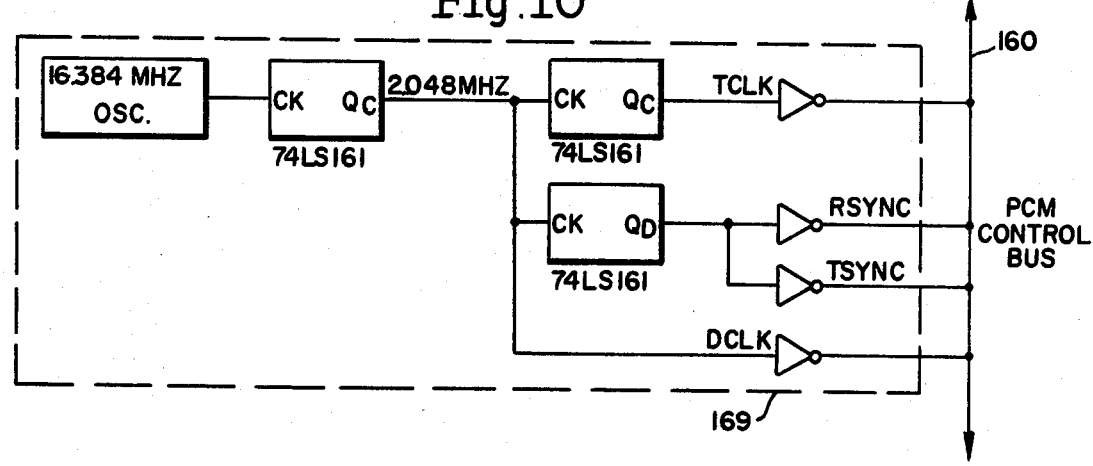
FIG. 10 is a detailed view of the clock circuits for the PCM highways.

An example of a suitable clock circuit 169 for the PCM highways is shown in FIG. 10 connected to control bus 160.

Figure 12:
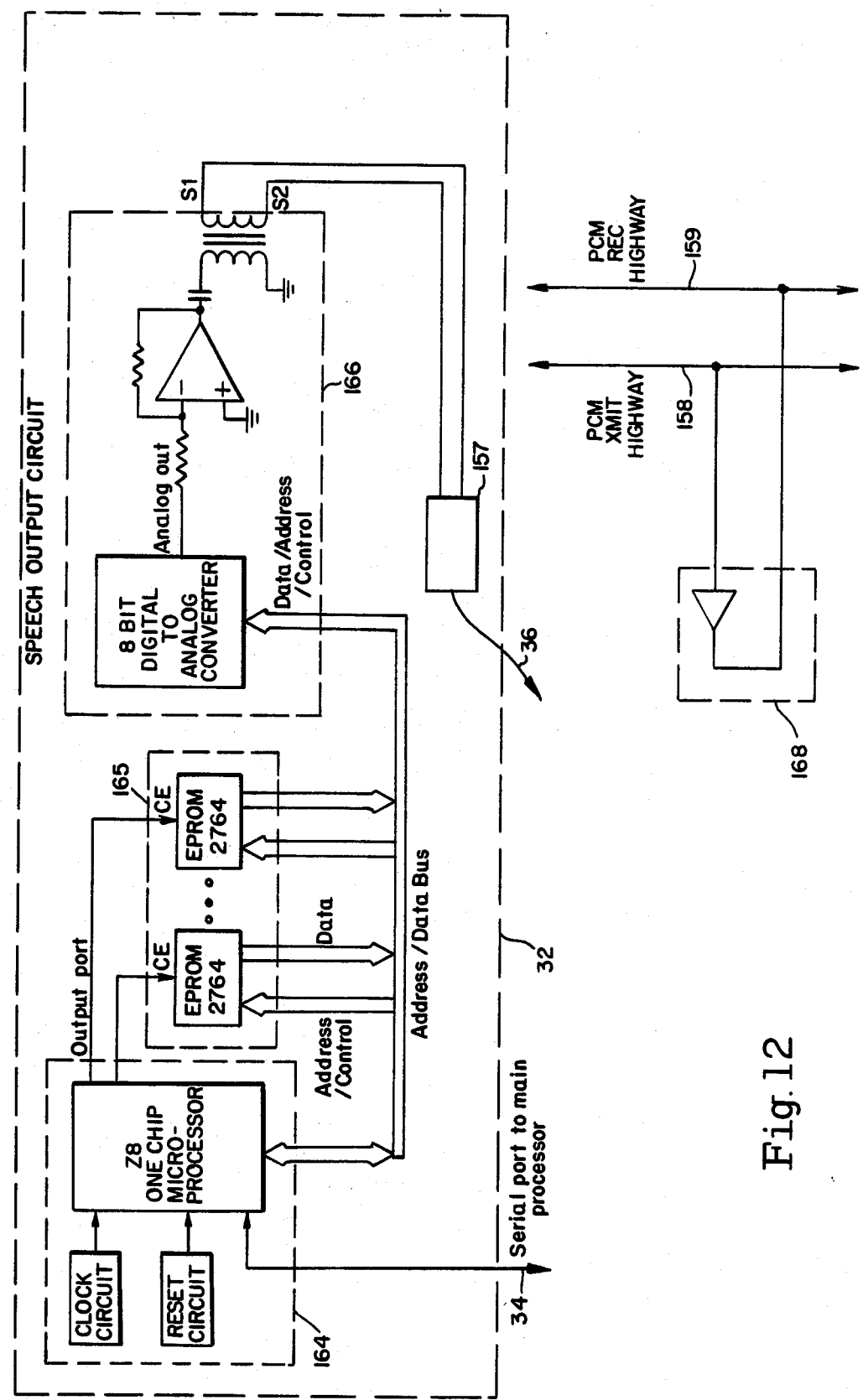
FIG. 12 is a detailed view of the speech output circuit of FIG. 2.
Figure 13:
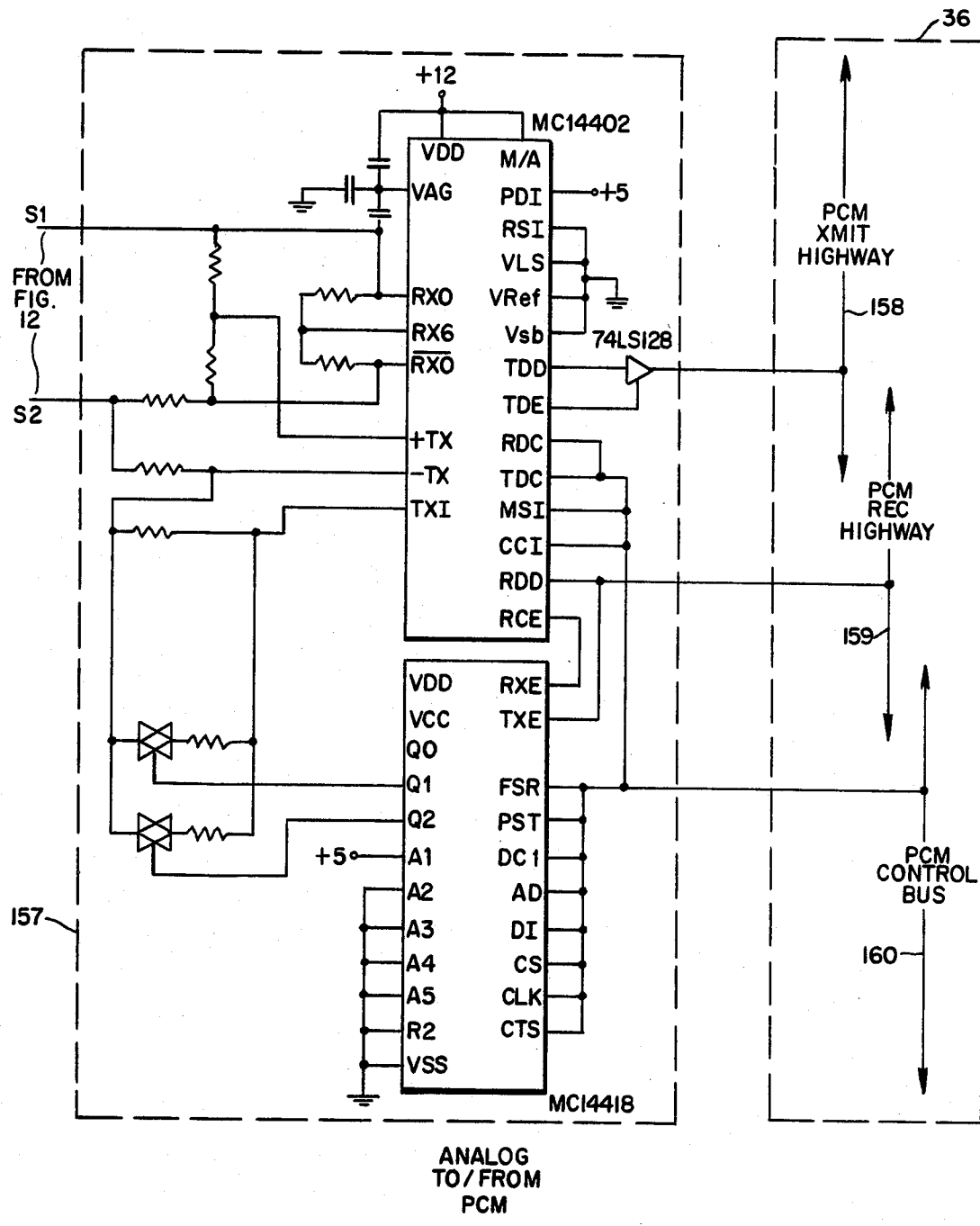
FIG. 13 is a detailed view of circuitry in the speech output unit of FIG. 12 for generating the voice digits and tones.

The transmit highway to receive highway buffering unit 168 of FIG. 4 is shown in detail in FIG. 12 connected to PCM transmit bus or highway 158 and PCM receives bus or highway 159.

FIG. 12 also illustrates a typical speech output circuit 32. This may consist of a single chip microprocessor in a speech/program memory 164. The microprocessor receives over its serial link 34 a code for which word it should output. The unit 164 then moves prestored speech samples for that word from its speech memory from the digital to analog converter unit 166 under control of the address control unit 165. The output of the unit 166 is coupled via lines S1 and S2 to the speech output unit 157. The unit 157 is shown in detail in FIG. 13 and comprises typical circuitry for generating the voice digits and tone. The analog output appears on line 36. When a word has been outputted (with a silent period) the microprocessor 164 sends a code signaling this on line 34. It is now ready to output another word.

Figure 14:
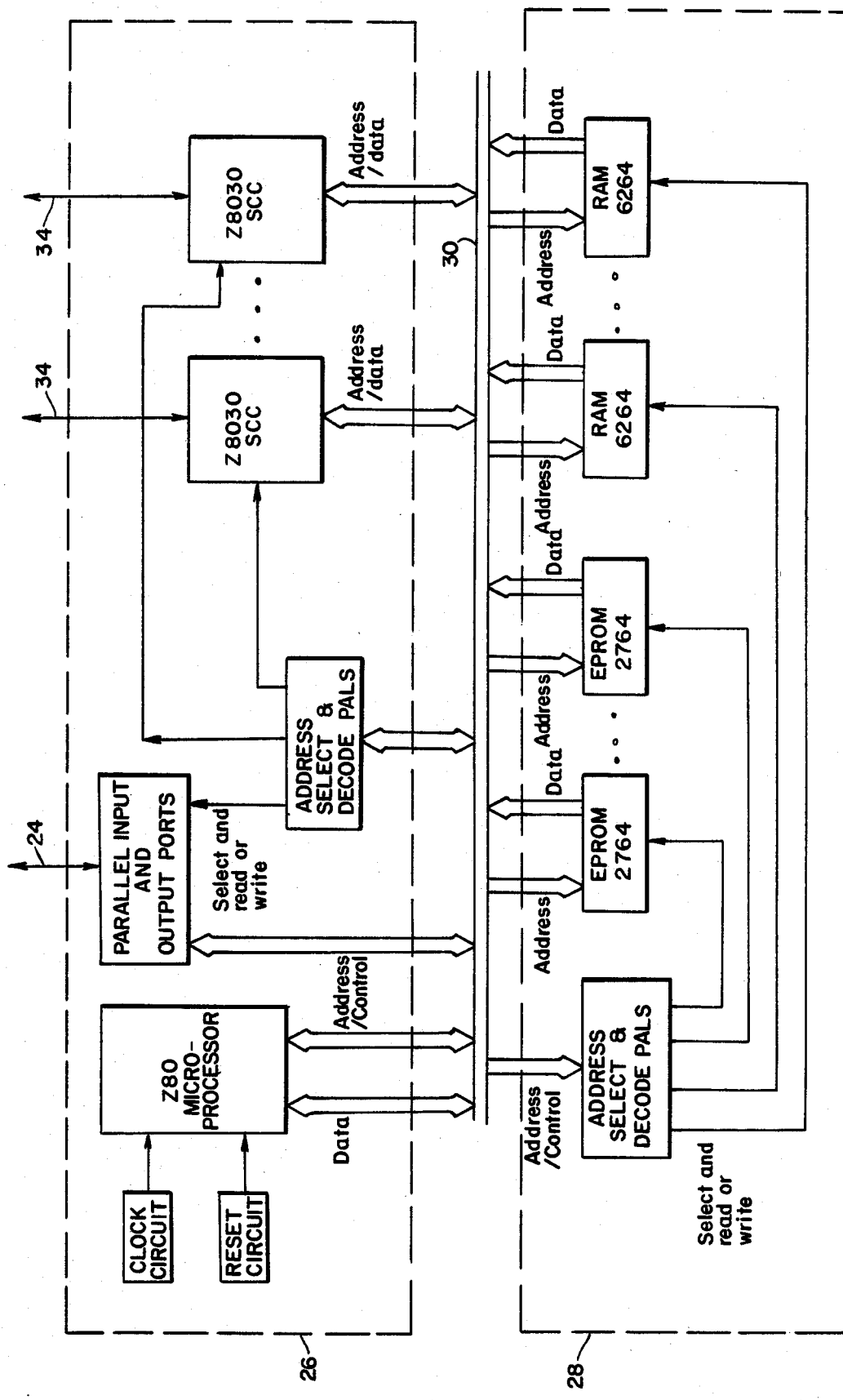
FIG. 14 is a detailed view of a portion of the microprocessor of FIG. 2.

The processor and memory sections 26 and 28 of FIG. 2 are shown in FIG. 14.

Figure 3A:
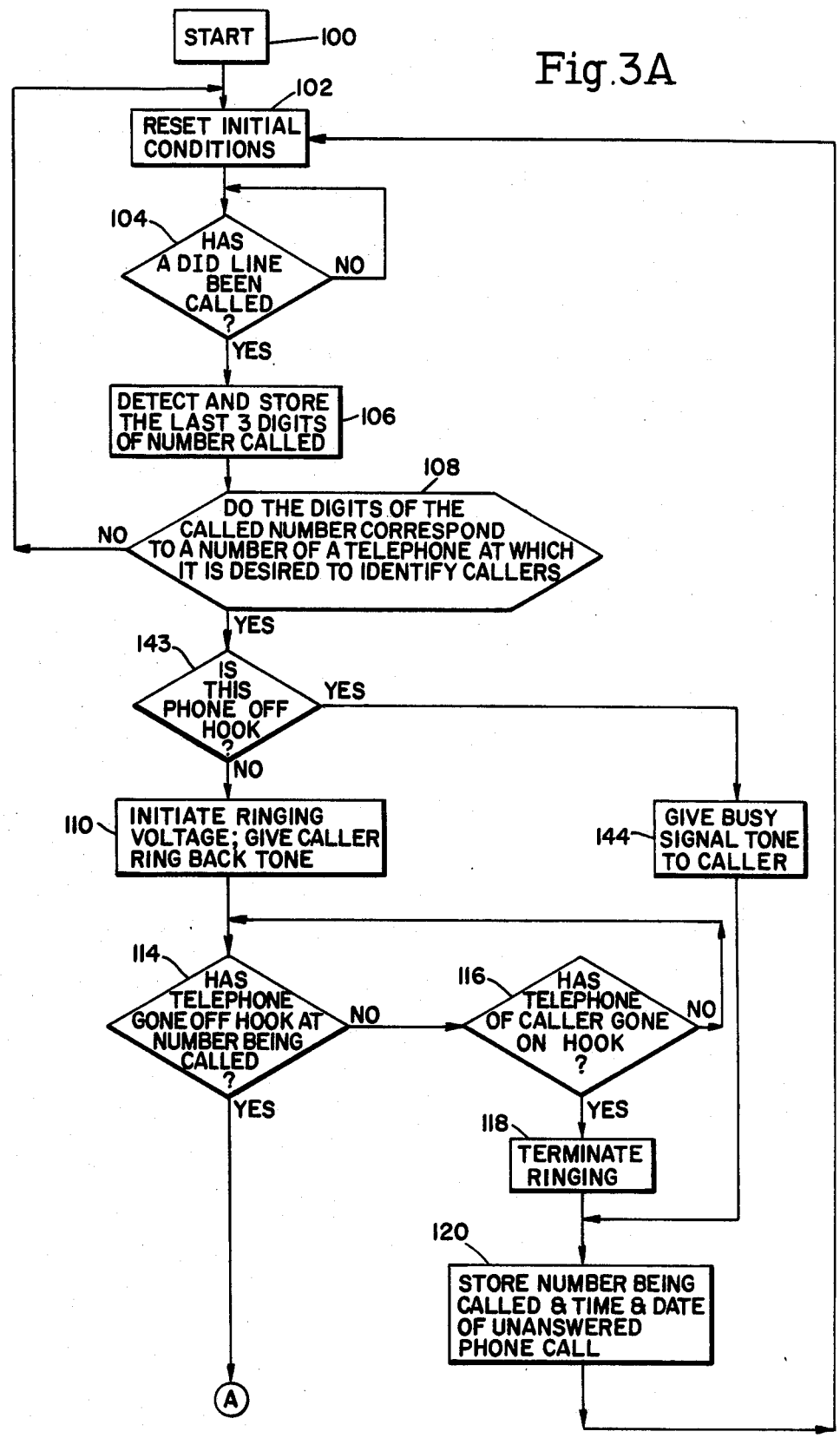
FIG. 3A is a partial view showing the first portion of a flow chart of a microprocessor control program which may be used by the microprocessor illustrated in FIG. 1 to control the present invention.
Figure 3B:
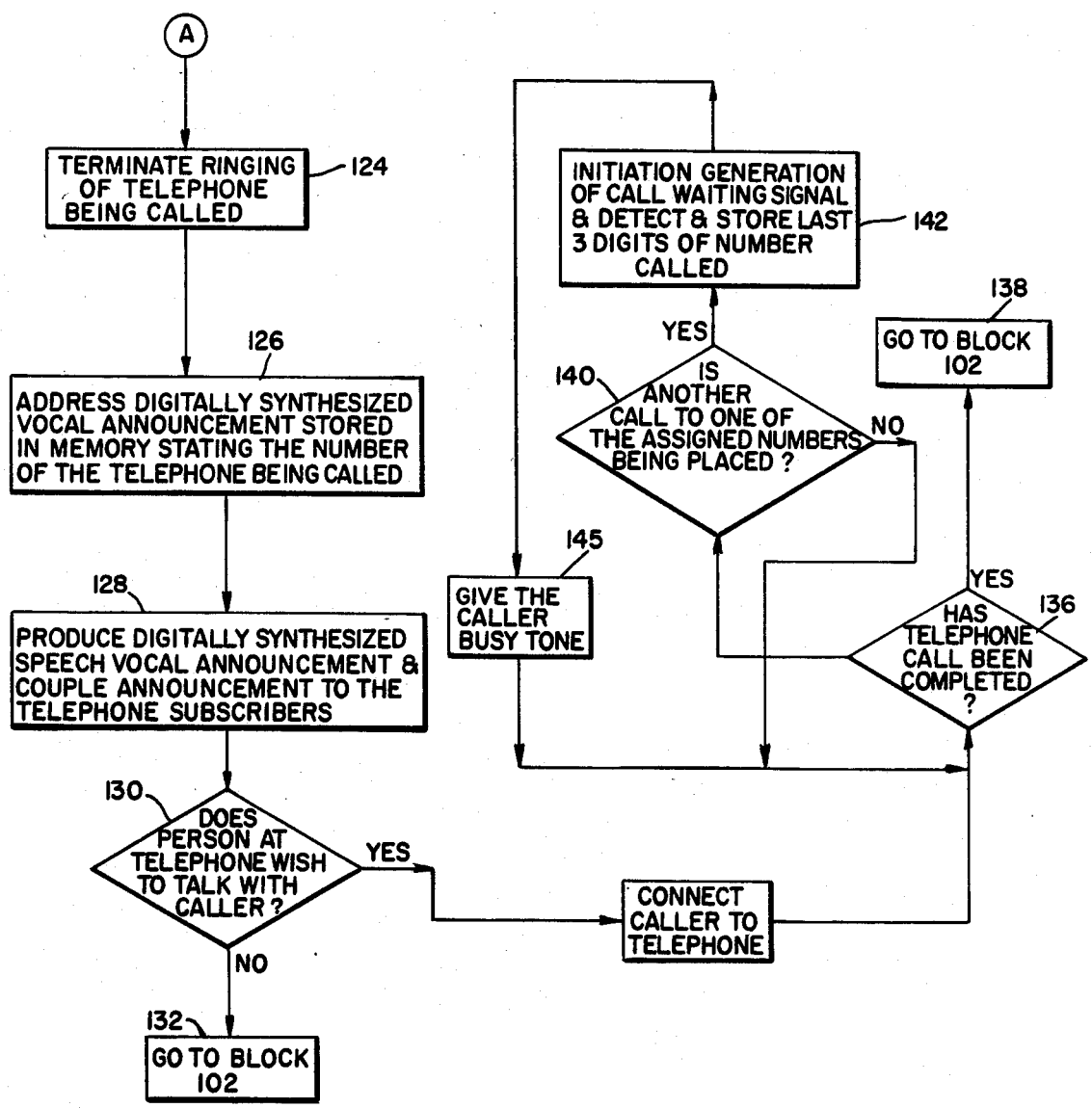
FIG. 3B is a continuation of FIG. 3A showing the second portion of the flow chart of a microprocessor control program which may be used by the microprocessor illustrated in FIG. 1 to control the present invention.

FIG. 3 illustrates a flow chart of a control program which may be used to operate the microprocessor 26 illustrated in FIGS. 1 and 2. The control program starts at block 100 and proceeds to block 102 where the initial conditions of the microprocessor and system are reset including the resetting of the memory 28 associated with the microprocessor and the speech synthesizer 32. The program then proceeds to decision point 104 where a determination is made of whether a call has been received on one of the twenty DID access lines 16 which are illustrated in FIGS. 1 and 2. If the answer is no, the program proceeds back to input decision point 104 and thus continues to loop until a call is received on one of the twenty DID access lines 16. If a call has been received on one of the twenty DID access lines 16 the program proceeds from the decision point 104 to block 106 where the last three digits of the number called are detected and stored in memory 28. As has been stated supra, the detection of the digits may be accomplished by a known DTMF detecting circuit which may provide a numerical indication of each digit which has been originated by detecting the presence of the frequencies associated with particular digits. With respect to rotary dial telephones, other known methods for detecting the dialed digits may be used.

The program proceeds from block 106 to decision point 108 where a determination is made if the detected digits correspond to a number of a telephone assigned to an existing subscriber. If the invention is fully utilized by subscribers, all input calls received on the DID access lines 16 would be routed one of the one hundred subscribers to the invention as specifically described herein. However, if the system is not completely subscribed so that some of the one hundred possible numbers are not operatively connected to subscriber's telephones, the inadvertent dialing of digits which correspond to unused subscriber lines would cuse the program to loop back to the reset initial conditions block 102.

If the answer is yes at decision point 108, the program proceeds to decision point 143 where a determination is made if the telephone at the subscriber's location is off hook. If the answer is no, the program proceeds to 110 where a ringing sound or ringing of the subscriber's telephone is initiated. The subscriber then picks up the phone and goes off hook to ascertain the number calling. This off hook condition is indicated at the decision point 114 by a yes decision. Once the subscriber goes off hook in this manner the ringing is terminated at 124. If the answer is no at decision point 114, the program proceeds to decision point 116 where a determination is made if the person placing the telephone call has gone on hook, i.e. the caller has given up trying to reach the subscriber. If the answer is no at decision 116, the program loops back to the entrance to decision point 114. It should be noted that the combination of decision points 114 and 116 insures that the telephone at the subscriber's location will continue to ring until either the subscriber picks it up or the caller goes on hook.

If the answer is yes at decision point 116, the program proceeds to block 118 where termination of the ringing of the subscriber's phone occurs. However, the ring back tone to the DID line caller continues. The termination of ringing of the subscriber's phone insures that the subscriber's line is ready to receive other phone calls. The program proceeds from block 118 to block 120 where the number being called, the time and date of the unanswered telephone are recorded in the memory 28.

Referring back to the decision point 143, if the subscriber's phone is off hook at the time of the initial identification of preselected digits at decision point 108 the answer is yes at decision point 143. This indicates that the subscriber is off hook because he is engaged in either a call to his listed number or a call to another of the assigned numbers. The program then proceeds to box 144 to give a busy signal to the caller. The program then proceeds to box 120 so that the calling number is stored in the manner described.

Referring back to block 120 relating to storing of the time and date of the unanswered telephone call, it should be understood that digital speech synthesis may be used in place of actually recording of the number being called, the time and date of the unanswered phone call stored at block 120. The program looops back from block 120 to block 102 previously described where the initial conditions are reset. If one call is receiving a ringing tone in the call waiting queue other additional incoming calls on the unlisted lines are rejected by sending a conventional off hook or busy signal.

At a later time when a person returns to the subscriber's telephone 21, the stored information pertaining to the unanswered calls may be obtained by the placing of a command at the subscriber's telephone such as the activation of a particular DTMF or push button tone or the dialing of a number. The detection of the command at the microprocessor may be made by known circuitry. The detected command can be used to activate a subroutine in the microprocessor control program to generate a digitally synthesized vocal announcement of the pertinent information regarding the unanswered call.

If the answer was yes at decision point 114, the program proceeds to block 124 where the ringing of the subscriber's telephone is terminated. The program proceeds to block 126 where the digitally synthesized vocal announcement stored in memory 28 is addressed by the previously detected and stored last three digits of the number which has been called. The program proceeds from block 126 to block 128 where the digitally synthesized vocal announcement is produced and coupled to the telephone 21 of the subscriber being called. The function performed by block 128 includes the closing of the appropriate switches within the switching matrix 22 to accomplish the connection of the synthesized speed message through the switching matrix to the subscriber being called. As stated supra, it should be clearly understood the generation of the synthesized speech message is known to those persons skilled in the art and it is, therefore, unnecessary to describe the particular ciruits and overall method by which digital synthesized speech messages are produced. Moreover, the invention is not limited to a particular design of switching matrix 22. The control of switching matrix relays by a microprocessor is known and therefore, will not be described herein.

The program proceeds from block 128 to decision point 130 where a determination is made if the person at the subscriber's telephone wishes to talk with the caller. If the answer at decision point 130 is no, the program proceeds to block 132 where the program loops back to previously described block 102. If the answer is yes at decision point 130, the program proceeds to block 134 where the caller is connected to the telephone line of the subscriber by the closing of appropriate relays within the switching matrix 22 of FIG. 2.

The program proceeds from block 134 to decision point 136 where a determination is made if the telephone call has been completed, i.e. terminated by either party hanging up or going on hook. Decision point 136 looks for a disconnect. If the answer is yes, the program proceeds to block 138 where the program loops back to previously described block 102 where the initial conditions are set. If the answer is no at decision point 136, the program proceeds to decision point 140 where a determination is made if another call is being made to one of the numbers assigned to the particular subscriber who is currently engaged in a telephone conversation which has been initiated by calling on one of the assigned unlisted numbers. If the answer is no at decision point 140 the program loops back to the entrance to decision point 136 which has been previously described. If the answer is yes at decision point 140, the program proceeds to block 142 where the initiation of generation of a call waiting signal is started and the last three digits of the number called are detected and stored. The call waiting signal is produced by the generation of a tone for a predetermined period of time such as 100 milliseconds which tone has a particular frequency and is periodic every six seconds. Thus, every six seconds the person at the subscriber's location will hear a beep on the telephone indicating that another person is waiting. It should be understood that the call waiting signal is terminated immediately upon completion of the previously existing telephone call. Substantially simultaneously with the yes answer at decision point 140 the program proceeds from box 142 to box 145 to give the caller a busy signal.

The method by which the person at the subscriber's telephone signals the microprocessor 26 that he wishes to speak or not speak with the caller may be implemented in a number of ways. A first method for signaling the microprocessor 26 that the person at the subscriber's telephone wishes to talk with the caller is for the person answering the telephone at the subscriber's location to place the telephone momentarily on hook for a preselected time interval (e.g. between 100 milliseconds and 1 second) which causes the generation of a discontinuity in current flow in the line between the switching matrix and the subscriber'telephone. A current discontinuity less than the lower limit of duration is ignored. If the person at the subscriber's telephone goes on hook for a period longer than the preselected time interval, the microprocessor interprets the action as "hanging up" the telephone and does not connect the caller to the subscriber'telephone. The microprocessor control program can implement the detection of the subscriber'telephone going on hook momentarily by the use of a timer which produces a signal to cause the switching matrix to connect the caller when the current discontinuity is within a preselected duration. This discontinuity in current may be detected to initiate the connection of the incoming call through one of the DID access lines 16 through the switching matrix 22 to the particular subscriber's telephone line 20. Circuits which monitor the change in current flow in telephone lines which is consequent from the telephone going on and off hook are per se known and therefore, no description herein will be given of a suitable circuit. It should be clearly understood that any circuit which will perform the function of monitoring D.C. current level in the telephone line may be used to implement detecting the "going on hook momentarily" command of the person at the subscriber's telephone that it is desired to receive the call.

A second way for the person at the subscribers's telephone to signal the microprocessor that he desires to receive or not receive the telephone call is by the generation of an appropriate tone by pushing an appropriate button on the telephone. A particular DTMF tone or tone generated by a push button telephone may be assigned specifically as an indication that the person at the subscriber's telephone wishes to receive the incoming call. A conventional DTMF detector may be used for indicating if the person at the subscriber's telephone wishes to receive the incoming call.

Other types of signals may be generated at the subsciber's telephone to signal the microprocessor that it is disired to connect the caller to the subscriber's telephone. The command from a person at a subscriber's telephone that it is desired to receive a call may be implemented with any type of signaling mechanism which may be either keyed to tones or other types of signals which may be conventionally generated by commercially available telephones or alternatively, in conjunction with special circuits which are connected to commericalldy available telephones. From the standpoint of the economics, it is least expensive to utilize the capability of commercially available telephones to generate the appropriate control signal to cause the incoming call to be connected to the subscriber's telephone.

A final method by which the microprocessor may be signaled to connect the incoming call on the DID access lines 16 to the subscriber's telephone line 20 is for the person at the subscriber's telephone to stay off hook for a period of time sufficient to cause a timer to time out within the microprocessor control program, the length of time chosen in the program being a matter of design choice. The timer may be activated by a current sensor which detects the flow of current consequent from the telephone going off hook. The current detectors described supra may be contained within or coupled to the switching matrix 22. It should be clearly understood that the invention is not limited to the foregoing three types of mechanisms for signaling the microprocessor that the person at the subscriber's telephone wishes to receive the incoming telephone call.

In the second embodiment of the invention, the previously described system is modified to generate and transmit to the subscriber's telephone 21 a digitally synthesized audible frequency range code to the person at the subscriber's telephone 21 that a call is being placed to one of the numbers assigned to the customer. The audible frequency range code may be detected by the person at the subscriber's telephone 21 by the subscriber making an audible identification of the code and associating that identification with a call being placed to one of the assigned numbers. An example of any audible code, without limitation, is the use of a predetermined number of rings to identify a call on each assigned number. In this case, the ringing sound should be distinguishable from the ringing used for calls on the subscriber's telephone. The audible frequency range code may also be detected electronically. The electronic detection circuitry would be located at or in proximity to the subscriber's telephone 21 and is coupled to the line 20. An example of the system with electronic detection of the audible frequency range code generates a different digitally synthesized DTMF tone in response to the detection of the placement of a call to each of the assigned numbers. Each different tone is detected by a DTMF detector to a different signaling mechanism to permit a person at the subscriber's telephone 21 to determine who is placing the incoming call from knowledge of the number called.

It should be clearly understood that the previously described flow chart is merely exemplary of a suitable control program which may be used to implement the function of the microprocessor. Moreover, it should be clearly understood that other functions may be implemented in the microprocessor control program, such as the random generation of busy signal to facilitate security at the location of the telephone, dialing from memory to expedite the dialing of commonly called numbers, etc.

While the invention has been described in terms of its preferred embodiment, it should be clearly understood that the invention is subject to numerous modifications which do not depart from its scope as defined by the appended claims.

What I claim and desire to have covered by Letters Patent of the United States is:

1. A telephone call identifying and handling apparatus comprising:
   switching and microprocessing means for connection to a central office through multiple DID access lines and multiple input lines and for connection to telephones of a plurality of subscribers, at least one output line connecting said switching and microprocessing means to each subscriber's telephone, including:
   (a) means for connecting output lines from said subscriber's telephone to said input lines from said central office;
   (b) means for assigning a plurality of numbers to each of said DID lines for each output line and for each subscriber's telephone;
   (c) means for identifying one of said plurality of assigned numbers called at a subscriber's telephone;
   (d) means for producing at a subscriber's telephone a ring signal responsive to a call on an assigned number;
   (e) means responsive to said means for identifying an assigned number called at a subscriber's telephone to produce at said subscriber's telephone a vocal announcement of the identity of the called assigned number; and
   (f) means actuatable, at the election of the subscriber, at said subscriber's telephone for connecting a caller placing a call on an assigned number to the subscriber's telephone.

2. A telephone apparatus in accordance with claim 1 further comprising:
   (a) means for identifying a caller by storing the identity of the called number and the time of the telephone call thereto;
   (b) means for determining the on/off hook condition of the subscriber's telephone at the time a call is received on a DID line; and
   (c) means responsive to said means for determining said on/off hook condition to actuate said means for storing when an off hook condition is determined.

3. A telephone apparatus in accordance with claim 2 further comprising:
   (a) means actuatable by a subscriber to interrogate said means for storing; and
   (b) means to generate and transmit to the subscriber's telephone the stored information relating to identity of the called number and time of the call.

4. A telephone apparatus in accordance with claim 2 including:
   (a) means for generating a ring back tone to the caller; and
   (b) means for connecting said ring back tone to the caller during such time that a telephone of said caller is off hook and said caller either receives a busy signal or is connected to the subscriber's telephone at the election of the subscriber.

5. A telephone apparatus in accordance with claim 1 wherein said means actuatable at said subscriber's telephone comprises:
   (a) means for sensing the flow of current in the telephone line between the central office and the subscriber's telephone consequent from the said telephone being off hook; and
   (b) means responsive to the means for sensing the flow of current to cause the connection of a call on an assigned number to the subscriber's telephone when the sensed current has a discontinuity within a predetermined time interval.

6. A telephone apparatus in accordance with claim 1 wherein said means actuatable at said subscriber's telephone comprises:
   (a) means for electively generating a control signal by a person at said subscriber's telephone;
   (b) means for sensing the generation of said control signal; and
   (c) means responsive to the means for sensing the generation of said control signal for connecting to the subscriber's telephone, in response to the control signal electively generated at said subscriber's telephone, a caller placing a call on an assigned number.

7. A telephone apparatus in accordance with claim 1 wherein said means actuatable at said subscriber's telephone comprises:
   (a) means for sensing the completion of the generation of the vocal announcement; and
   (b) means responsive to the means for sensing the completion of the vocal announcement for causing the connection of the caller placing a call on an assigned number to the subscriber's telephone.

8. A telephone apparatus in accordance with claim 6 wherein the control signal is a DTMF tone.

9. A telephone apparatus in accordance with claim 1 further comprising:
   (a) means for detecting calls to each of the assigned numbers which have not been connected to a person at the subscriber's telephone;
   (b) means responsive to the means for detecting for storing the called number, time and date of each unanswered telephone call to each one of the assigned numbers; and
   (c) means responsive to a signal produced at the subscriber's telephone for causing the generation of a message on the subscriber's telephone of the called number, time and date of each unanswered telephone call to the subscriber's telephone.

10. A telephone apparatus in accordance with claim 1, further comprising:
   (a) means for detecting the connection of a call to the subscriber's telephone; and
   (b) means responsive to the means for detecting the connection of a caller and to the concurrent placement of another call to one of the assigned numbers for producing a periodic signal for a predetermined time interval which is audible to a person talking on the subscriber's telephone.

11. A telephone call identifying and handling apparatus for connection to a central office through multiple DID access lines and multiple input lines and for connection to telephones of a plurality of subscribers, at least one output line connecting said switching and microprocessing means to each subscriber's telephone comprising switching and microprocessing means which includes:
   (a) means for connecting output lines from said subscriber's telephone to said input lines from said central office;
   (b) means for assigning a plurality of numbers to each of said DID lines for each output line and for each subscriber's telephone;
   (c) means for identifying one of said plurality of assigned numbers called at a subscriber's telephone;
   (d) means for producing at a subscriber's telephone a ring signal responsive to a call on an assigned number, said ring signal being distinguishable from a ring signal produced by the telephone central office to signal that a call is being placed on a listed number of the subscriber;
   (e) means responsive to said member for identifying an assigned number called at a subscriber's telephone by producing at said subscriber's telephone a vocal announcement of the identity of the called assigned number; and
   (f) means actuatable at said subscriber's telephone for connecting to the subscriber's telephone, at an election of the subscriber, a caller placing a call on an assigned number to the subscriber's telephone.

12. A method for identifying callers who place calls to a subscriber on any of a group of different numbers assigned by a central telephone office to a telephone line of the subscriber, the calls to any of the numbers assigned to the subscriber's telephone being from any telephone installation which is coupled with the central telephone office to which the subscriber's line is coupled, the method comprising the steps of:
   (a) identifying one of the group of assigned numbers called at the subscriber's telephone;
   (b) determining whether the subscriber's telephone is off hook;
   (c) applying a ringing signal to the subscriber's telephone if it has been determined tht the subscriber's telephone is not off hook;
   (d) producing, subject to initiation by the subscriber, a vocal announcement of the number used to call the subscriber's telephone; and
   (e) applying the vocal announcement to the subscriber's telephone line so that a person answering the subscriber's telephone receives the announcement prior to connection to the caller.

13. A method in accordance with claim 13 comprising the further steps of:
   (a) storing information as to the identity of the assigned number used to call the subscriber's telephone if it has been determined that the subscriber's telephone is off hook; and (b) producing an announcement of said stored information on demand from the subscriber's telephone.

14. A telephone apparatus in accordance with claim 4 including:
   (a) means for generating a ring back tone to the caller; and
   (b) means for connecting said ring back tone to the caller during such time a telephone of said caller is off hook and said caller either receives a busy signal or is connected to the subscriber's telphone at the election of the subscriber.

15. A telephone apparatus in accordance with claim 2 further comprising:
   (a) means for detecting the connection of a call to the subscriber's telephone; and
   (b) means responsive to the means for detecting the connection of a caller and to the concurrent placement of another call to one of the assigned numbers for producing a periodic signal for a predetermined time interval which is audible to a person talking to the subscriber's telephone.

16. A telephone apparatus in accordance with claim 3 further comprising:
   (a) means for detecting the connection of a call to the subscriber's telephone; and
   (b) means responsive to the means for detecting the connection of a caller and to the concurrent placement of another call to one of the assigned numbers for producing a periodic signal for a predetermined time inteval which is audible to a person talking on the subscriber's telephone.

17. A telephone apparatus in accordance with claim 4 further comprising:
   (a) means for detecting the connection of a call to the subscriber's telephone; and
   (b) means responsive to the means for detecting the connection of a caller and to the concurrent placement of another call to one of the assigned numbers for producing a periodic signal for a predetermined time interval which is audible to a person talking on the subscriber's telephone.

18. A telephone apparatus in accordance with claim 5 further comprising:
   (a) means for detecting the connection of a call to the subscriber's telephone; and
   (b) means responsive to the means for detecting the connection of a caller and to the concurrent placement of another call to one of the assigned numbers for producing a periodic signal for a perdetermined time interval which is audible to a person talking on the subscriber's telephone.

19. A centralized telephone apparatus providing a plurality of different assigned numbers for each of a plurality of subscribers thereto, wherein different callers access a subscriber by calling different respective ones of said plurality of numbers assigned to the subscriber, including means at a central station for identification of callers by identification of an assigned number being used by the caller to place an incoming call to the subscriber, comprising:
   (a) means for detecting the respective assigned number of a subscriber being called by the caller,
   (b) memory means for storing a plurality of caller identifying data for identifying a plurality of callers;
   (c) programmed microprocessor means responsive to the detected assigned number being called for addressing said memory means in accordance with the detected assigned number of the incoming call and for accessing data identifying the caller initiating the incoming call,
   (d) message generating means responsive to the caller identifying data for providing a caller identifying message to the subscriber,
   (e) signal generating means operable by the subscriber in response to a received caller identifying message for generating a signal indicative of the subscriber's desire to be connected to the incoming call, and
   (f) switching matrix means responsive to said subscriber generated signal for connecting a DID line incoming to the centralized apparatus for a central office to the subscriber's telephone.

20. A centralized telephone apparatus as recited in claim 19 wherein said message generating means comprises a digital voice synthesizing means, said memory means stores a plurality of messages to be voice synthesized by said voice synthesizing means, and said programmed microprocessor means is operable to decode the last three digits of the called number for addressing said member means to extract a particular message corresponding to a particular caller to be voice synthesized by said voice synthesizing means.

21. A centralized telephone apparatus as recited in claim 19, wherein said programmed microprocessor means is programmed for initiating operations by resetting initial conditions of the system and for detecting whether a DID line has been called,
   when a DID line has been called said programmed microprocessor means also programmed for detecting and storing a predetermined subset of digits of a called number,
   said programmed microprocessor means also programmed for determining whether the subset of digits corresponds to a number of a telephone having a plurality of assigned numbers for identification of callers, and if not for returning to initite operations again.
   when the subset of digits corresponds to a number of a telephone having a plurality of assigned numbers for caller identification, said programmed microprocessor means also programmed for determining whether the called telephone is off-hook and, if off-hook for provding a busy signal to the caller, for storing the particular assigned number being called as well as the date and time of the unanswered call and for returning to initiate operations again,
   when the called telephone is not off-hook, said programmed microprocessor means also programmed for initiating a ringing voltage for the called telephone and for providing to the caller a ring back tone,
   said programmed microprocessor means also programmed for determining whether, after initiating the ringing voltage and providing the ring back tone, the called telephone has gone off-hook and, if not, for determining whether the caller has gone on-hook, said programmed microprocessor means also programmed for terminating ringing if the caller has gone on hook, continuing the ring back tone, and for executing the storing of the assigned number, date and time of the unanswered call and for returning to initiate operations again, while if the caller has not gone on hood for again determining whether the called telephone has gone off-hook, if the called telephone has gone off-hook, said programmed microprocessor means also programmed for terminating ringing of the called telephone, for accessing the caller identifying data in the memory means and for causing said message generating means to provide to the subscriber the caller identifying message.

22. A centralized telephone apparatus as recited in claim 21 wherein said programmed microprocessor means is also programmed for determining whether the called subscriber wishes to be connected to the caller, and if not for returning to initiate operations again, if the subscriber wishes to be connected to the caller, said programmed microprocessor means also programmed for causing said switching matrix means to connect a DID line carrying the incoming call to the subscriber's telephone.

23. A centralized telephone apparatus as recited in claim 22 wherein said programmed microprocessor means is also programmed for, after causing said switching matrix to connect the call to the subscriber's telephone, determining whether or not the telephone call has been completed and if so for returning to initiate operations again, if the call has not been completed, said programmed microprocessor means also programmed for determining whether or not a new incoming call is being placed to one of the assigned numbers of the subscriber's telephone, and if not to return to again determine whether or not the current telephone call has been completed, if a new incoming call is being placed to one of the assigned numbers of the subscriber's telephone while the presently connected call has not terminated, said programmed microprocessor means also programmed for initiating a call-waiting signal, for detecting and storing a subset of the digits of the assigned number being called in the new call, for providing a busy tone to the new caller and for returning to again determine whether or not the current telephone call has been completed and for responding to the determination as hereinabove recited.

24. A centralized telephone apparatus as recited in claim 21 wherein said message generating means comprises a digital voice synthesizing means, said memory means stores a plurality of messages to be voice synthesized by said voice synthesizing means, and said programmed microprocessor means is operable to decode the last three digits of the called number for addressing said memory means to extract a particular message corresponding to a particular caller to be voice synthesized by said voice synthesizing means.

25. A method for identifying callers to a single telephone instrument of a subscriber, comprising the steps of:

(a) assigning a plurality of different telephone numbers to said single telephone instrument;

(b) associating different ones of said assigned telephone numbers with different callers;

(c) at a centralized station, detecting a particular assigned number of a subscriber being called by a caller;

(d) searching a central memory at the centralized station for a particular identifying message respectively associated with the called assigned number;

(e) generating for the subscriber the identifying message from the memory, and (f) transmitting to the subscriber the identifying message from the centralized station, thereby identifying to the subscriber the caller based on the called number assigned to the telephone instrument.

26. The method recited in claim 25 wherein said generating step is performed prior to connection of the caller to the telephone instrument of the subscriber, and comprising the further step of generating a control signal at the telephone instrument of the subscriber for controlling connection of the caller thereto, thereby providing the subscriber control over connection of a caller to the telephone instrument of the subscriber after identification of the caller.

* * * * *